(12) United States Patent
Zhang et al.

(10) Patent No.: US 9,611,628 B2
(45) Date of Patent: Apr. 4, 2017

(54) TYPE WATER OUTPUT CONVERTER

(71) Applicant: Xiamen Runner Industrial Corporation, Xiamen (CN)

(72) Inventors: Rong-Gui Zhang, Xiamen (CN); Ming Li, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 14/859,038

(22) Filed: Sep. 18, 2015

(65) Prior Publication Data

US 2016/0138250 A1 May 19, 2016

(30) Foreign Application Priority Data

Nov. 17, 2014 (CN) .................... 2014 2 0686277 U

(51) Int. Cl.
*F16K 11/02* (2006.01)
*E03C 1/02* (2006.01)
*F16K 31/122* (2006.01)

(52) U.S. Cl.
CPC .............. *E03C 1/023* (2013.01); *F16K 11/02* (2013.01); *F16K 31/1223* (2013.01); *E03C 2201/30* (2013.01); *Y10T 137/2514* (2015.04); *Y10T 137/268* (2015.04)

(58) Field of Classification Search
CPC ........ E03C 1/08; E03C 2201/30; E03C 1/023; E03B 7/07; E03B 7/075; F16K 11/02; F16K 31/1223; Y10T 137/268; Y10T 137/2514; Y10T 137/2516; Y10T 137/2519; Y10T 137/2521; Y10T 137/2683; Y10T 137/87161; Y10T 137/87153; Y10T 137/2665; Y10T 137/2663
See application file for complete search history.

(56) References Cited

U.S. PATENT DOCUMENTS

| | | | | |
|---|---|---|---|---|
| 1,986,206 | A | * 1/1935 | Kennedy | ............. F16K 31/1223 137/625.26 |
| 2,090,843 | A | * 8/1937 | King | ..................... G05D 16/10 137/494 |
| 2,470,471 | A | * 5/1949 | Carleton | ............... F16K 15/063 137/513 |
| 2,593,701 | A | * 4/1952 | Sanford | ............. G05D 23/1313 137/506 |

(Continued)

*Primary Examiner* — Kevin Murphy
*Assistant Examiner* — David Colon Morales
(74) *Attorney, Agent, or Firm* — Chun-Ming Shih

(57) ABSTRACT

A new type water output converter includes: a valve body, and a valve sleeve. Wherein, in the valve body is provided with a first water route and a second water route. One of which is switched to open or close through using the valve sleeve. The water output of the second water route is controlled through an outside connected switch. The position of the valve sleeve is adjusted by the outside connected switch through feedback of water pressure in the second water route. When the outside connected switch is switched off, the valve sleeve is pushed to move upward by the water pressure in the second water route, to open the first water route. When the outside connected switch is switched on, the valve sleeve is pushed to move downward by the water pressure in the first water route, to close the first water route.

7 Claims, 3 Drawing Sheets

(56) References Cited

U.S. PATENT DOCUMENTS

| | | | | | |
|---|---|---|---|---|---|
| 2,949,933 | A | * | 8/1960 | Moen | F16K 3/18 137/119.08 |
| 2,973,001 | A | * | 2/1961 | McAuley | C02F 1/42 137/118.06 |
| 2,990,840 | A | * | 7/1961 | Marvin | G05D 23/1313 137/630.14 |
| 3,317,181 | A | * | 5/1967 | Robbins, Jr. | F16K 31/1223 251/63.4 |
| 3,570,517 | A | * | 3/1971 | Odenthal | F15B 11/02 137/87.06 |
| 3,742,970 | A | * | 7/1973 | Gross | F15B 20/005 116/268 |
| 4,224,956 | A | * | 9/1980 | Klein | G05D 11/003 137/114 |
| 4,574,894 | A | * | 3/1986 | Jadwin | E21B 21/103 137/118.03 |
| 4,609,006 | A | * | 9/1986 | Parkison | E03C 1/04 137/119.04 |
| 4,610,264 | A | * | 9/1986 | Georgiev | A01G 25/162 137/110 |
| 4,926,897 | A | * | 5/1990 | Perrott | F16K 11/0746 137/98 |
| 5,205,313 | A | * | 4/1993 | Moretti | F16K 35/14 137/112 |
| 5,823,229 | A | * | 10/1998 | Bertrand | B01D 35/043 137/549 |
| 5,884,653 | A | * | 3/1999 | Orlandi | G05D 23/1313 137/100 |
| 6,093,313 | A | * | 7/2000 | Bovaird | B01D 35/04 137/551 |
| 6,135,154 | A | * | 10/2000 | Chen | B01D 35/04 137/625.29 |
| 6,394,124 | B1 | * | 5/2002 | Wu | F16K 11/02 137/119.04 |
| 6,920,892 | B2 | * | 7/2005 | Agresta | E03C 1/04 137/119.04 |
| 6,978,795 | B2 | * | 12/2005 | Perrin | F16K 11/048 137/119.04 |
| 7,000,854 | B2 | * | 2/2006 | Malek | B05B 1/1618 137/625.48 |
| 7,077,153 | B2 | * | 7/2006 | Segien, Jr. | E03C 1/04 137/119.01 |
| 7,494,074 | B2 | * | 2/2009 | Benstead | B05B 1/1618 239/11 |
| 7,909,269 | B2 | * | 3/2011 | Erickson | B05B 1/1618 137/801 |
| 2003/0102256 | A1 | * | 6/2003 | Takagi | B01D 35/04 210/101 |
| 2005/0145554 | A1 | * | 7/2005 | Cunningham | C02F 1/281 210/282 |
| 2010/0012197 | A1 | * | 1/2010 | Liu | E03C 1/023 137/119.04 |
| 2010/0154896 | A1 | * | 6/2010 | Thrash, Jr. | F16K 11/044 137/112 |
| 2010/0155639 | A1 | * | 6/2010 | Zhou | B05B 1/1609 251/213 |
| 2011/0030823 | A1 | * | 2/2011 | Seal | E03C 1/04 137/603 |
| 2013/0153039 | A1 | * | 6/2013 | Deubler | F16K 31/122 137/1 |
| 2013/0167959 | A1 | * | 7/2013 | Zhou | F16K 11/168 137/625.48 |
| 2013/0327431 | A1 | * | 12/2013 | Zhou | B05B 1/1609 137/861 |
| 2014/0054484 | A1 | * | 2/2014 | Chang | F16K 1/34 251/318 |
| 2014/0250586 | A1 | * | 9/2014 | Zhadanov | B05B 1/16 4/615 |

* cited by examiner

TYPE WATER OUTPUT CONVERTER

BACKGROUND OF THE INVENTION

Field of the Invention

The present invention relates to a faucet water output switching device, and in particular to a new type water output converter.

The Prior Arts

Presently, the water output from a faucet is faucet water or purified water. In case these two kinds of water output are required at the same time, then a complicated water output switching device has to be used to perform switching, to open or close the respective water input tubes, rather than perform switching through the water output end, for example, an outside connected switch.

Therefore, presently, the design and performance of the faucet water output switching device is not quite satisfactory, and it leaves much room for improvement.

SUMMARY OF THE INVENTION

In view of the problems and drawbacks of the prior art, the present invention provides a new type water output converter, to overcome the shortcomings of the prior art.

A major objective of the present invention is to provide a new type water output converter, that is simple in structure, novel in design, and easy to operate. As such, it is able to realize outputting two kinds of water, and control the switching between two water routes through opening or closing of one of the water routes by an outside connected switch through feedback.

In order to achieve the objective mentioned above, the present invention provides a new type water output converter, comprising: a valve body and a valve sleeve. In the valve body is provided with a first water route outside the valve sleeve and a second water route inside the valve sleeve. One of the first water route and the second water route is switched to open or close through using the valve sleeve. The water output of the second water route is controlled through an outside connected switch. The position of the valve sleeve is adjusted by the outside connected switch through feedback of water pressure in the second water route. When the outside connected switch is switched off, the valve sleeve is pushed to move upward by the water pressure in the second water route, to open the first water route. When the outside connected switch is switched on, the valve sleeve is pushed to move downward by the water pressure in the first water route, to close the first water route.

The first water route is formed by a first water input channel on the lower portion of the valve body, and a first water output channel on an upper portion of the valve body; while the second water route is formed by a second water input channel on the lower portion of the valve body, and a second water output channel on the upper portion of the valve body. The valve sleeve is placed between the second water input channel and second water output channel. The second water input channel and second water output channel are in communication with each other through a central through hole of the valve sleeve. When the valve sleeve is in a position of an upper stop point, the first water input channel and the first water output channel are connected in communication with each other. When the valve sleeve is in a position of a lower stop point, the first water input channel and the first water output channel are disconnected from each other.

The valve sleeve is a step-shape hollow structure. Around the periphery of the upper portion of the valve sleeve is provided with a first ring slot; while in the first ring slot is disposed a first O-shape sealing ring blocking the first water output channel and the second water output channel. Around the periphery of the central portion of the valve sleeve is provided with a central ring slot; while in the central ring slot is provided with a central O-shape sealing ring blocking the first water input channel and the first water output channel. Around the periphery of the lower portion of the valve sleeve is provided with a second ring slot; while in the second ring slot is disposed a second O-shape sealing ring blocking the first water input channel and the second water input channel.

Further, a water output sleeve is sleeved inside the second water output channel, and is controlled by an outside connected switch. In the water output sleeve is formed a second water output channel. The first water output channel is formed between the outer wall of the water output sleeve and the inner wall of the valve body. The inner periphery of the water output sleeve and the outer periphery of the upper portion of the valve sleeve are in tight seal cooperation through the first O-shape sealing ring. The lower end of the water output sleeve is disposed an outer flange for positioning the upper stop point of the valve sleeve. In a central portion of the valve body is disposed a valve seat for positioning the lower stop point of the valve sleeve. The opening on the upper end of the valve seat is to act in cooperation with the central O-shape sealing ring at the central portion of the valve sleeve.

Further, the cross section of the lower portion of the valve sleeve is greater than the cross section of the upper portion of the valve sleeve.

Further, the first water input channel and the second water input channel are disposed vertically in parallel, while the second water input channel and the second water output channel are disposed vertically in connection.

Further, the first water route is a faucet water route, while the second water route is a purified water route.

Compared with the Prior Art, the new type water output converter of the present invention has the following advantages: simple in structure, novel in design, and easy to control and operate. As such, it can realize the function of outputting two kinds of water, such as faucet water and purified water, to control move-up and move-down of the valve sleeve, through open or close of an outside connected switch in the second water route by means of feedback, in achieving water output conversion between two water routes.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
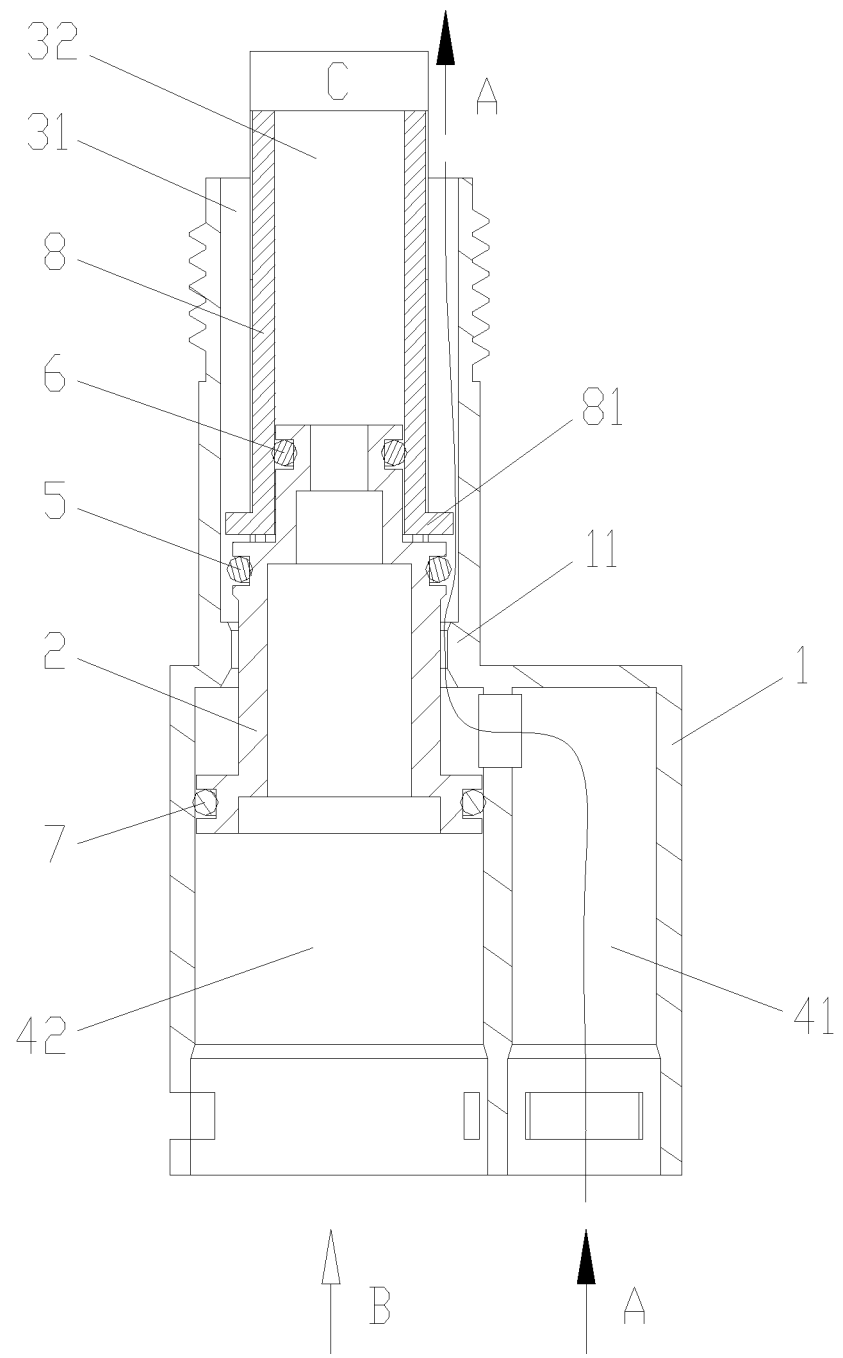
FIG. 1 is a schematic diagram of a water output for a first water route of a new type water output converter according to an embodiment of the present invention.
Figure 2:
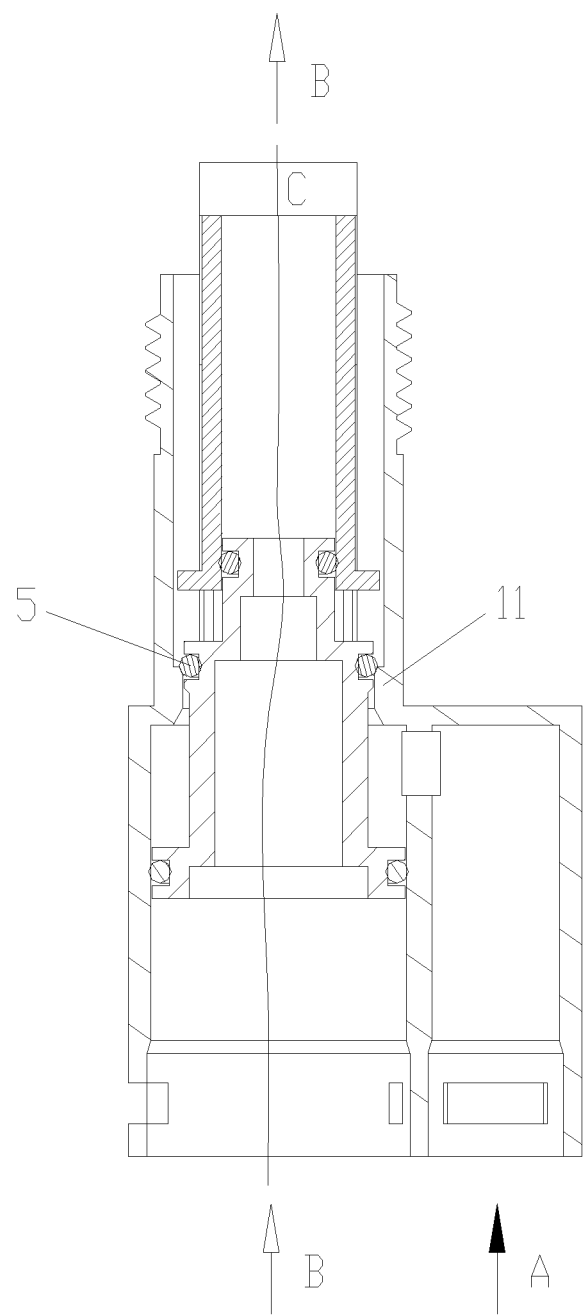
FIG. 2 is a schematic diagram of a water output for a second water route of a new type water output converter according to an embodiment of the present invention.
Figure 3:
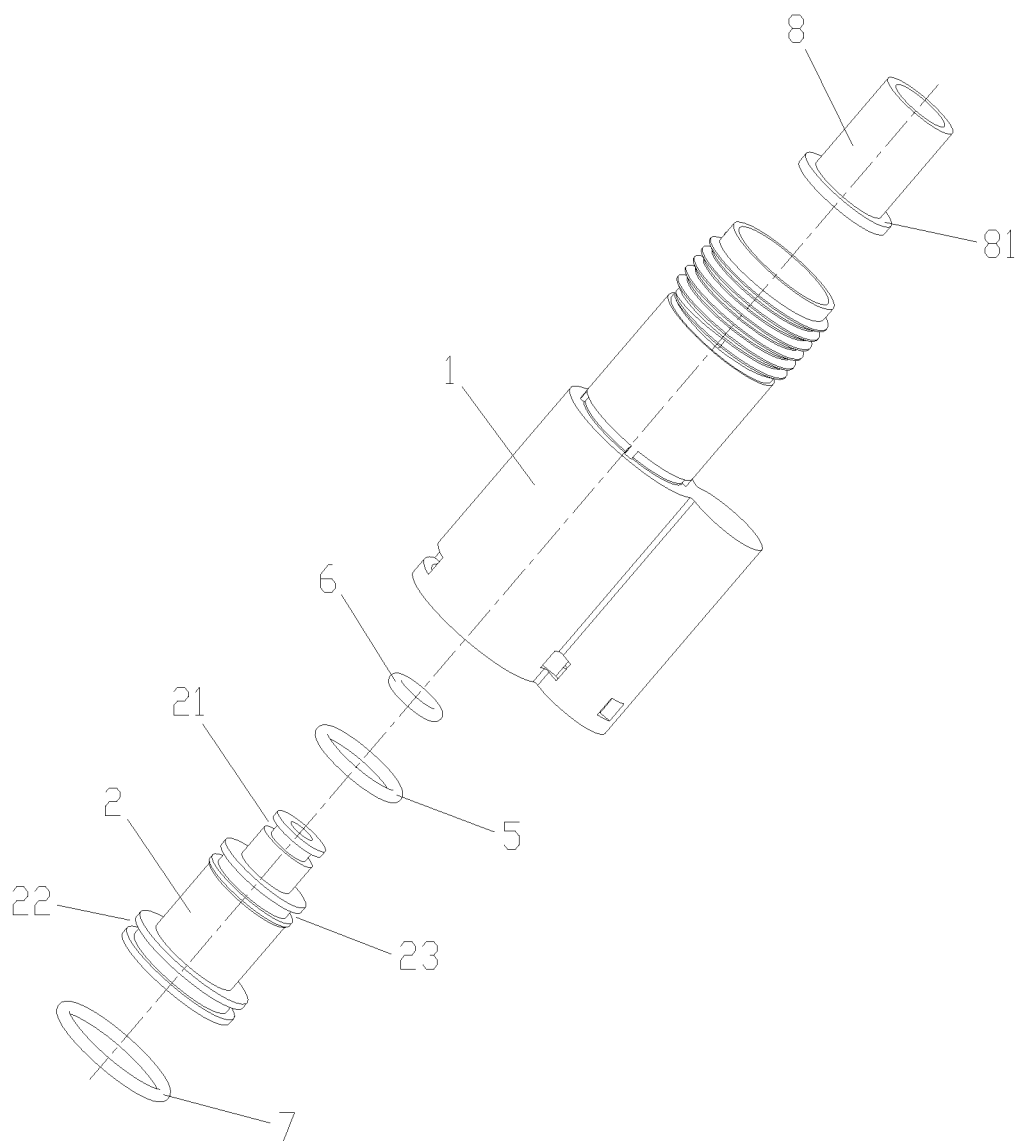
FIG. 3 is an exploded view of a structure for a new type water output converter according to an embodiment of the present invention.

Firstly, refer to FIGS. 1 to 3 for a schematic diagram of a water output for a first water route of a new type water output converter according to an embodiment of the present invention; a schematic diagram of a water output for a second water route of a new type water output converter according to an embodiment of the present invention; and an exploded view of a structure for a new type water output converter according to an embodiment of the present invention.

As shown in FIGS. 1 to 3, the new type water output converter includes a valve body 1 and a valve sleeve 2. In the valve body 1 is provided with a first water route A outside the valve sleeve 2 and a second water route B inside the valve sleeve 2. One of the first water route A and the second water route B is switched to open or close through using the valve sleeve 2. The water output of the second water route B is controlled through an outside connected switch C. The position of the valve sleeve 2 is adjusted by the outside connected switch C through feedback of water pressure in the second water route B. When the outside connected switch C is switched off, the valve sleeve 2 is pushed to move upward by the water pressure in the second water route B, to open the first water route A. When the outside connected switch C is switched on, the valve sleeve 2 is pushed to move downward by the water pressure in the first water route A, to close the first water route A.

When the outside connected switch C is switched off, the second water route B exerts an upward water pressure on the valve sleeve 2, that is greater than the downward water pressure exerted on the valve sleeve 2 by the first water route A. Therefore, the water pressure in the second water route B pushes the valve sleeve 2 to move upward, to open the first water route A. When the outside connected switch C is switched on, due to the release of pressure, the valve sleeve 2 is exerted a downward water pressure by the first water route A. Therefore, the water pressure in the first water route A pushes the valve sleeve 2 to move downward, to close the first water route A.

In the present embodiment, the first water route A is formed by a first water input channel 41 on the lower portion of the valve body 1, and a first water output channel 31 on an upper portion of the valve body 1; while the second water route B is formed by a second water input channel 42 on the lower portion of the valve body 1, and a second water output channel 32 on the upper portion of the valve body 1. The valve sleeve 2 is placed between the second water output channel 42 and second water output channel 32. The second water input channel 42 and second water output channel 32 are in communication with each other through a central through hole of the valve sleeve 2. When the valve sleeve 2 is in a position of an upper stop point, the first water input channel 41 and the first water output channel 31 are connected in communication with each other. When the valve sleeve 2 is in a position of a lower stop point, the first water input channel 41 and the first water output channel 31 are disconnected from each other.

In the present embodiment, the valve sleeve 2 is a 3-step trapezoid hollow structure. The cross section of the lower portion of the valve sleeve 2 is greater than the cross section of the upper portion of the valve sleeve 2.

Around the periphery of the upper portion of the valve sleeve 2 is provided with a first ring slot 21; while in the first ring slot 21 is disposed a first O-shape sealing ring 6 blocking the first water output channel 31 and the second water output channel 32. Around the periphery of the central portion of the valve sleeve 2 is provided with a central ring slot 23; while in the central ring slot 23 is provided with a central O-shape sealing ring 5 blocking the first water input channel 41 and the first water output channel 31. Around the periphery of the lower portion of the valve sleeve 2 is provided with a second ring slot 22; while in the second ring slot 22 is disposed a second O-shape sealing ring 7 blocking the first water input channel 41 and the second water input channel 42.

In the present embodiment, inside the second water output channel 32 is sleeved a water output sleeve 8 controlled by an outside connected switch C. In the water output sleeve 8 is formed a second water output channel 32. The first water output channel 31 is formed between the outer wall of the water output sleeve 8 and the inner wall of the valve body 1. The inner periphery of the water output sleeve 8 and the outer periphery of the upper portion of the valve sleeve 2 are in tight seal cooperation through the first O-shape sealing ring 6. The lower end of the water output sleeve 8 is disposed an outer flange 81 for positioning the upper stop point of the valve sleeve 2. The central portion of the valve body 1 is provided with a valve seat 11 for positioning the lower stop point of the valve sleeve 2. The opening on the upper portion of the valve seat 11 is to act in cooperation with the central O-shape sealing ring 5 at the central portion of the valve sleeve 2. When the central O-shape sealing ring 5 and the slant face of the opening on the upper portion of the valve seat 11 are in tight seal cooperation, at this time, the first water route A is closed. When the central O-shape sealing ring 5 and the slant face of the opening on the upper portion of the valve seat 11 are disengaged from each other, at this time, the first water route A is opened.

In the present embodiment, the first water input channel 41 and the second water input channel 42 are disposed vertically in parallel. The upper side wall of the first water input channel 41 is provided with an opening connected to the second water input channel 42 in communication. The second water input channel 42 and the second water output channel 32 are disposed vertically in connection. The first water route A formed by the first water input channel 41 and the first water output channel 31 is referred to as a faucet water route. The second water route B formed by the second water input channel 42 and the second water output channel 32 is referred to as a purified water route. To be more specific, water can be feedbacked to the water output converter through the outside switch C in the purified water route, to switch and determine the output water is faucet water or purified water.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A new type water output converter, comprising:

a valve body, and a valve sleeve, wherein the valve body having its inside provided with a first water route outside the valve sleeve and a second water route inside the valve sleeve, one of the first water route and the second water route is switched to open or close through using the valve sleeve, the water output of the second water route is controlled through an outside connected switch; and the valve sleeve having its position adjusted by the outside connected switch through feedback of water pressure in the second water route, such that when the outside connected switch is switched off, the valve sleeve is pushed to move upward by the water pressure in the second water route, to open the first water route, when the outside connected switch is switched on, the valve sleeve is pushed to move downward by the water pressure in the first water route, to close the first water route, wherein the first water route is formed by a first water input channel on a lower portion of the valve body, and a first water output channel on an upper portion of the valve body; while the second water route is formed by a second water input channel on the lower portion of the valve body, and a second water output channel on the upper portion of the valve body, the valve sleeve is placed between the second water input channel and second water output channel, the second water input channel and second water output channel are in communication with each other through a central through hole of the valve sleeve, when the valve sleeve is in a position of an upper stop point, the first water input channel and the first water output channel are connected in communication with each other, and when the valve sleeve is in a position of a lower stop point, the first water input channel and the first water output channel are disconnected from each other;

wherein the valve sleeve is a step-shape hollow structure, around a periphery of the upper portion of the valve sleeve is provided with a first ring slot, while in the first ring slot is disposed a first O-shape sealing ring blocking the first water output channel and the second water output channel; around the periphery of a central portion of the valve sleeve is provided with a central ring slot, while in the central ring slot is provided with a central O-shape sealing ring blocking the first water input channel and the first water output channel; around the periphery of the lower portion of the valve sleeve is provided with a second ring slot, while in the second ring slot is disposed a second O-shape sealing ring blocking the first water input channel and the second water input channel.

2. The new type water output converter as claimed in claim 1, wherein a water output sleeve is sleeved inside the second water output channel and is controlled by the outside connected switch, in the water output sleeve is formed the second water output channel, the first water output channel is formed between an outer wall of the water output sleeve and an inner wall of the valve body, an inner periphery of the water output sleeve and the periphery of the upper portion of the valve sleeve are in tight seal cooperation through the first O-shape sealing ring, the lower end of the water output sleeve is disposed an outer flange for positioning the upper stop point of the valve sleeve, in a central portion of the valve body is disposed a valve seat for positioning the lower stop point of the valve sleeve, the opening on the upper portion of the valve seat is to act in cooperation with the central O-shape sealing ring in the central portion of the valve sleeve.

3. The new type water output converter as claimed in claim 1, wherein a cross section of a lower portion of the valve sleeve is greater than the cross section of an upper portion of the valve sleeve.

4. The new type water output converter as claimed in claim 2, wherein a cross section of a lower portion of the valve sleeve is greater than the cross section of an upper portion of the valve sleeve.

5. The new type water output converter as claimed in claim 1, wherein the first water input channel and the second water input channel are disposed vertically in parallel, while the second water input channel and the second water output channel are disposed vertically in connection.

6. The new type water output converter as claimed in claim 2, wherein the first water input channel and the second water input channel are disposed vertically in parallel, while the second water input channel and the second water output channel are disposed vertically in connection.

7. The new type water output converter as claimed in claim 1, wherein the first water route is a faucet water route, while the second water route is a purified water route.

* * * * *